United States Patent
Seaman et al.

(10) Patent No.: US 7,146,063 B2
(45) Date of Patent: Dec. 5, 2006

(54) METHOD AND APPARATUS FOR DETECTING AND FIXING INCORRECT DATE TAGS ON DIGITAL IMAGES

(75) Inventors: Mark D. Seaman, Greeley, CO (US); Eric E. Williams, Fort Collins, CO (US); Virgil Kay Russon, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 808 days.

(21) Appl. No.: 10/354,599

(22) Filed: Jan. 29, 2003

(65) Prior Publication Data

US 2004/0146220 A1   Jul. 29, 2004

(51) Int. Cl.
*G06K 9/60* (2006.01)
*G06K 9/68* (2006.01)

(52) U.S. Cl. ..................................... 382/305
(58) Field of Classification Search ............... 382/305; 396/279, 310, 315; 386/46, 65; 713/178
See application file for complete search history.

(56) References Cited

U.S. PATENT DOCUMENTS

| | | | | |
|---|---|---|---|---|
| 5,579,066 A | * | 11/1996 | Miyamoto et al. | 396/279 |
| 5,610,675 A | * | 3/1997 | Iwamatsu et al. | 396/315 |
| 6,334,030 B1 | * | 12/2001 | Mizumo et al. | 396/310 |
| 6,377,744 B1 | * | 4/2002 | Wakui | 386/46 |
| 6,661,966 B1 | * | 12/2003 | Furuyama et al. | 386/65 |
| 6,792,536 B1 | * | 9/2004 | Teppler | 713/178 |
| 6,948,069 B1 | * | 9/2005 | Teppler | 713/178 |

* cited by examiner

*Primary Examiner*—Amir Alavi

(57) ABSTRACT

A method and apparatus for detecting and fixing incorrect dates tagged to digital images is disclosed. The current date on a digital imaging device and the dates tagged to digital images are used to determine any potentially incorrect dates tagged to the digital images. When the date on the digital imaging device is incorrect the dates tagged to the images may be incorrect. When the dates tagged to the images are old, or close to a default date, or have large gaps between groups, the dates may be incorrect. The potentially incorrect dates may be brought to the users attention, and after user conformation the dates are corrected.

26 Claims, 2 Drawing Sheets

METHOD AND APPARATUS FOR DETECTING AND FIXING INCORRECT DATE TAGS ON DIGITAL IMAGES

FIELD OF THE INVENTION

The field of this invention relates to digital images and more specifically to a method and apparatus for fixing incorrect dates tagged to the digital images.

BACKGROUND OF THE INVENTION

Digital imaging devices typically record the date and time that an image is captured. However, if the date in the digital imaging device was incorrectly set, or not set at all, the date recorded for the image could be incorrect. For example, when replacing the batteries in most digital cameras, the date and time needs to be entered. If the user skips over this step and does not enter a date, the digital imaging device typically defaults to a preset date and time. When the user captures images with this digital imaging device, the incorrect date will be recorded for each image.

Therefore there is a need for a method and apparatus that can detect and fix incorrect dates tagged to a digital image.

SUMMARY OF THE INVENTION

A method and apparatus that can detect one or more digital images tagged with an incorrect date.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
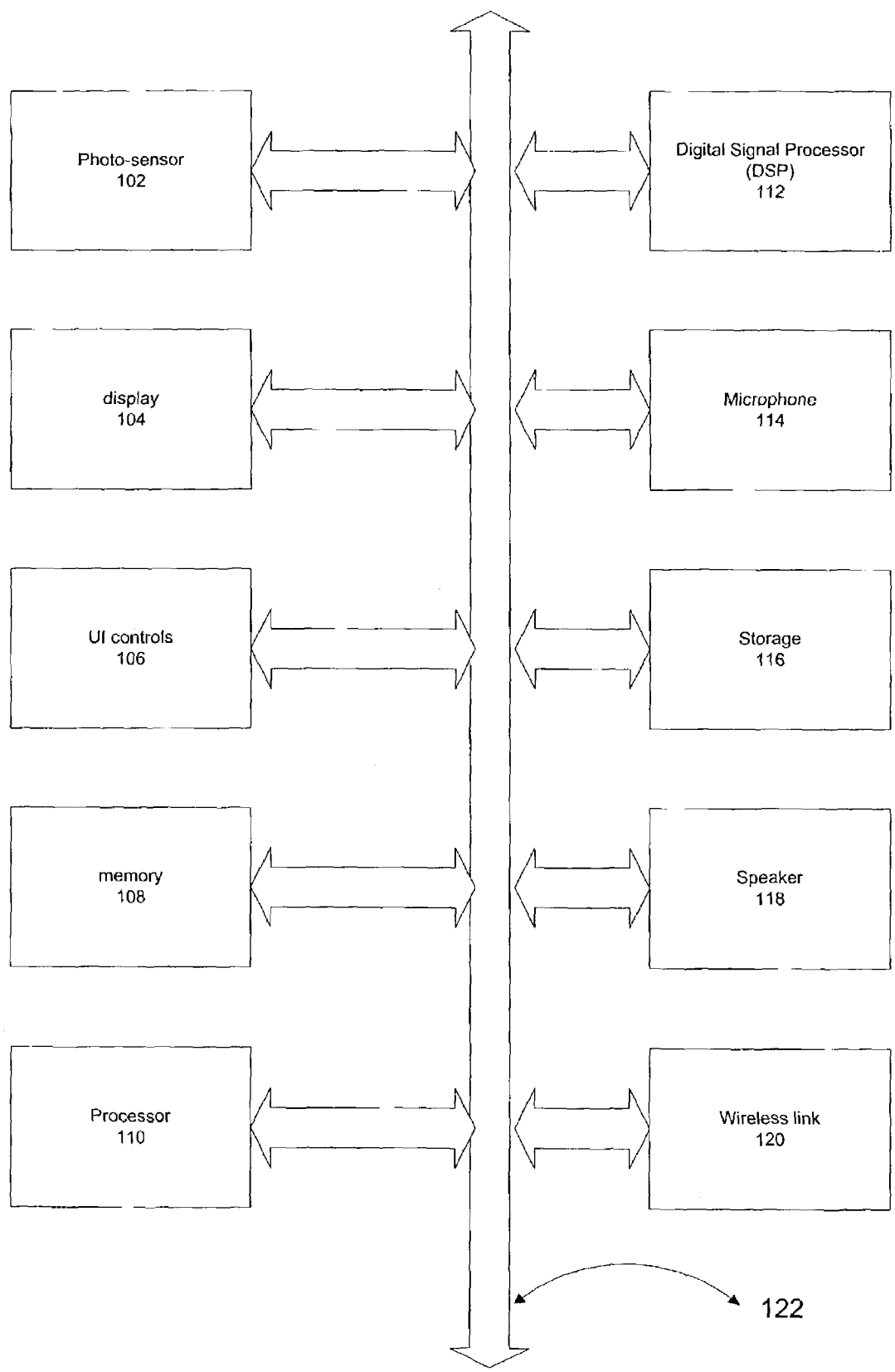
FIG. 1 is an electronic block diagram of a digital imaging system in accordance with an example embodiment of the present invention.
Figure 2:
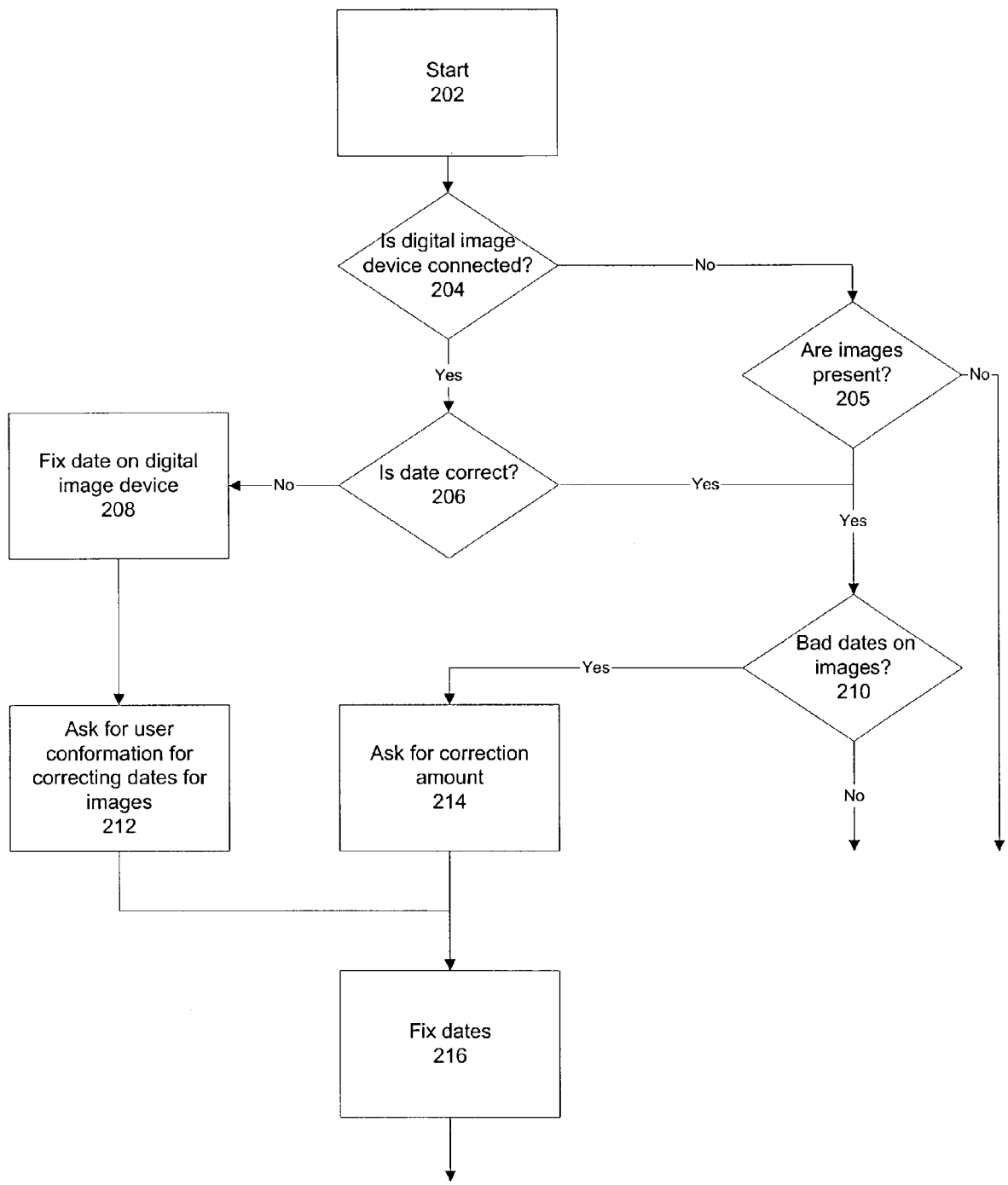
FIG. 2 is a flow chart for detecting and fixing incorrect dates tagged to a digital image in accordance with an example embodiment of the present invention.

An electronic block diagram of a typical digital imaging device is show in FIG. 1. Digital cameras today typically contain a photo-sensor (102) for capturing images; a display area (104) for displaying the captured images and controlling the digital camera; a storage area (116) for storing the captured images; memory (108), for temporary manipulation of the captured images and for running the firmware of the camera; a processor (110) for running the camera, and some type of user interface (UI) controls (106). Some digital cameras also include a microphone (114) for capturing audio clips along with the digital images. Some digital cameras include a speaker (118) and a digital signal processor (DSP 112). The UI controls (106) on digital cameras may include physical controls like buttons, rocker switches, a keyboard, and virtual controls shown in the display area. The digital images, video clips and audio clips captured by the digital camera may be stored in memory (108) or may be moved to the storage area (116). Today the memory and the storage area are typically different types of devices. The memory is typically fast volatile memory and the storage area is typically slower non-volatile memory. In the future, as the speed of non-volatile memory increases, all the memory may be of the non-volatile type. Digital imaging devices typically have an input/output (I/O) channel (122). This I/O channel may be a USB bus, a SCSI bus, an IR link, Fire Wire, or a parallel link. The I/O channel is used to connect the digital imaging device to other computer systems or networks. Some digital imaging devices connect to other computer systems using a camera dock. Digital cameras may also contain a wireless link (120) to the Internet, for example a cell phone.

A digital image file typically contains more information than just the raw image data. This additional data is typically called meta-data. Most image files contain the time and date the file was created. The digital imaging device typically maintains the current date and time. The date and time is typically entered by the user whenever the batteries (not shown) are replaced in the digital imaging device. When the user skips the step of entering the date and time the digital camera typically sets the date and time to a default date and time, for example Jan. 1, 2002, 12:00 pm. Once a date and time have been set the processor (110) typically monitors an internal timer to increment the date and time. When the user captures images with a digital imaging device that has the incorrect date and time set, the incorrect date and time will be recorded for each image captured. The incorrect date and time is typically not constant, but instead offset from the correct date and time by a constant amount. For example, when a user replaces the batteries in a digital camera on July $1^{st}$ and does not enter the correct time, and the default time is January $1^{st}$ of the same year, the date tagged to each image captured will be offset by 6 months. On July $20^{th}$, the camera will have the current date as January $20^{th}$.

Typically a digital camera has limited storage. Most digital cameras use removable storage. There are many types of removable storage, some use solid-state technology and others use non-solid-state technologies, some examples are: smart cards, memory sticks, mini-disks, tapes, and R/W-DVD's. When the current storage becomes full, the user can replace the storage device with an empty storage device and continue capturing images. The user can empty the storage device by moving the images onto a PC or transferring the images to more permanent storage on the Internet. The removable storage device can be connected to other systems using a reader, or the storage device can be emptied while still mounted in the digital imaging device. When the digital imaging device does not use removable storage the digital imaging device would need to be connected to another system to be able to move images from the digital imaging device.

Many digital imaging devices automatically upload the images stored in their memory when they detect they have been connected to a system or network. Some memory readers also automatically upload images when they detect a memory device being connected.

In one example embodiment of the current invention, a comparison (206) of the current date in the digital imaging device and the date in the connected system is done when the digital imaging device is first connected to the system. The comparison of the two dates can be done by either the software running on the digital imaging device or the software running on the system that is connected to the digital imaging device. When the dates don't match, the date on the system will typically be the correct date. That's because most systems don't run on replaceable batteries. When the dates don't match, the date on the digital imaging device is corrected to the current date from the system (208) and the difference between the dates is saved for later use.

In one example embodiment, before any changes are made, the user is prompted to confirm that the system date is the correct date (not shown). When there are images stored in the digital imaging device that had an incorrect date, the dates stored with the images are corrected using the stored difference between the old date on the digital imaging device and the current system date. The stored difference is added to each date stored with each image to determine the corrected date. In one example embodiment of the current invention, the user is asked for conformation before the dates are corrected (212). After the user confirms, the dates are fixed (216). In another example embodiment, the dates are fixed automatically.

In another example embodiment of the current invention, the dates saved with the images are used to determine if the dates are incorrect. When the dates on the images are older than a threshold amount compared to the current date, for example 6 months, the images may have the incorrect date. When there are large gaps between the dates of two groups of images, the older group may have the incorrect date. For example, when the user takes a number of images using an incorrect date, and then catches the error and corrects the date in the digital imaging device, there will be a group of images with older dates and a group of images with newer dates with a large gap in-between. In one example embodiment of the current invention, the gap in-between the two groups of images must be greater than 6 months before the older group is flagged as potentially having an incorrect date.

Another indicator of bad dates is when the images all have dates within a threshold amount of a default date. Many users will replace the batteries just before a photo taking session. When the user skips setting the date, the camera will default to the default date. Any photo captured soon after will have dates within a short time of the default date. Therefore any images that have dates within a threshold amount of a default date may have incorrect dates. One exception to this case is when the default date is close to the current date. For example, when the default date of a new camera is Jan. 1, 2003 and the current date is Jan. 25, 2003, images that have dates close to the default date are probably marked correctly.

The default date threshold amount can be set to a number of different lengths. In one example embodiment, the threshold amount is 2–3 days and in another example embodiment the threshold amount is 2 weeks. The threshold amount may be set to include images dated for as long as one month after the default date.

Once a potential incorrect date has been detected, the user is notified. When the user has confirmed that the dates are incorrect, the user is asked for a correction amount or for the correct date (214). Using the correction amount or the correct date, the dates are corrected (216).

In one example embodiment of the current invention, a graphical representation of a time line for when each image was dated is presented to the user, for example a histogram of the images along a timeline. This may help the user determine if the dates of the images are incorrect. It may also help the user determine the correct date.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
   connecting a digital imaging device to a system;
   comparing a current date on the digital imaging device with a current system date;
   advancing a date of at least one digital image stored on the digital imaging device, using the difference between the current date on the digital imaging device and the current system date.

2. The method of claim 1 where the user is prompted for permission before the dates are advanced.

3. The method of claim 1 where the user is prompted for conformation that the difference between the current date on the digital imaging device and the current system date is ok to use as the amount to advance the dates of the digital images stored on the digital imaging device.

4. The method of claim 1 where the system is a PC.

5. The method of claim 1 where the system is a network.

6. The method of claim 1 where the system is the World Wide Web.

7. The method of claim 1 where the current date on the digital imaging device is advanced by the difference between the current date on the digital imaging device and the current system date.

8. A method comprising:
   uploading at least one digital image file to a system;
   detecting an incorrect date tagged to the at least one digital image file by comparing the inncorrect date of the at least one digital image file with a system date;
   prompting the user for a correction amount;
   adjusting the date on the uploaded at least one digital imaging file using the correction amount.

9. The method of claim 8 where the system is a PC.

10. The method of claim 8 where the system is a network.

11. The method of claim 8 where the system is the World Wide Web.

12. The method of claim 8 where the at least one digital image file was uploaded from a stand-alone memory device.

13. The method of claim 8 where the at least one digital image file was uploaded from a digital imaging device.

14. The method of claim 8 where the date is corrected on both the uploaded digital image file and the original digital image file.

15. The method of claim 8 where the date for the at least one digital image file is older than the current system date by a predetermined amount.

16. The method of claim 8 where the date for the at least one digital image file is within a predetermined amount of a default date.

17. The method of claim 16 where the default date is different from the current date by a predetermined amount.

18. A digital imaging device, comprising:
   a UI control configured to allow a user to set a current date for the digital imaging device;
   a processor configured to monitor a counter to determine the passage of time and increment the current date;
   an image sensor configured to capture images of a scene, the processor configured to tag the captured images with the current date;
   a memory configured to store the captured images;
   an I/O channel configured to connect with a system;

the processor configured to determine a current system date when connected to the system;

the processor configured to adjust the date tagged to the captured images using the difference between the digital imaging device's current date and the current system date.

19. The method of claim 18 where the user is prompted for permission before the dates are adjusted.

20. The method of claim 18 where the user is prompted for conformation that the difference between the current date on the digital imaging device and the current system date is ok to use as the amount to adjust the dates of the digital images stored on the digital imaging device.

21. The method of claim 18 where the system is a PC.

22. The method of claim 18 where the system is a network.

23. The method of claim 18 where the system is the World Wide Web.

24. The method of claim 18 where the current date on the digital imaging device is advanced by the difference between the current date on the digital imaging device and the current system date.

25. A computer system, comprising:

a UI control configured to allow a user to set the computer system's current date;

a processor configured to monitor a counter to determine the passage of time and increment the current system date;

a memory configured to store at least one digital image;

an I/O channel configured to connect with a digital imaging device;

the processor configured to determine the digital imaging device's current date when connected to the computer system;

the processor configured to adjust the data tagged to at least one captured image, stored on the digital imaging device, using the difference between the digital imaging device's current date and the current system date.

26. A digital imaging device, comprising:

a means for setting a current date for the digital imaging device;

a means for incrementing the current date;

an means for capturing an image of a scene and tagging the captured image with the current date;

a means for storing the captured image;

an means for connecting with a system;

a means for determining a current system date when connected to the system;

a means for adjusting the date tagged to the captured images using the difference between the digital imaging device's current date and the current system date.

* * * * *

UNITED STATES PATENT AND TRADEMARK OFFICE
CERTIFICATE OF CORRECTION

| | | |
|---|---|---|
| PATENT NO. | : 7,146,063 B2 | Page 1 of 1 |
| APPLICATION NO. | : 10/354599 | |
| DATED | : December 5, 2006 | |
| INVENTOR(S) | : Mark D. Seaman et al. | |

It is certified that error appears in the above-identified patent and that said Letters Patent is hereby corrected as shown below:

In column 4, line 33, in Claim 8, delete "inncorrect" and insert -- incorrect --, therefor.

Signed and Sealed this

Fifth Day of May, 2009

JOHN DOLL
*Acting Director of the United States Patent and Trademark Office*